US012610213B2

(12) United States Patent
Michalopoulos et al.

(10) Patent No.: US 12,610,213 B2
(45) Date of Patent: Apr. 21, 2026

(54) PROVISION OF UE'S SURROUNDING INFORMATION

(71) Applicant: Nokia Technologies Oy, Espoo (FI)

(72) Inventors: Diomidis Michalopoulos, Munich (DE); Anil Kirmaz, Munich (DE); Oana-Elena Barbu, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 266 days.

(21) Appl. No.: 18/032,731

(22) PCT Filed: Oct. 19, 2020

(86) PCT No.: PCT/EP2020/079307
§ 371 (c)(1),
(2) Date: Apr. 19, 2023

(87) PCT Pub. No.: WO2022/083842
PCT Pub. Date: Apr. 28, 2022

(65) Prior Publication Data
US 2023/0396960 A1     Dec. 7, 2023

(51) Int. Cl.
*H04W 4/029*          (2018.01)
*H04W 4/02*           (2018.01)
*H04W 4/38*           (2018.01)

(52) U.S. Cl.
CPC ........... *H04W 4/029* (2018.02); *H04W 4/023* (2013.01); *H04W 4/38* (2018.02)

(58) Field of Classification Search
CPC ........ H04W 4/029; H04W 4/023; H04W 4/38
See application file for complete search history.

(56) References Cited

U.S. PATENT DOCUMENTS 9,524,448 B2    12/2016  Wedge
2014/0142799 A1   5/2014  Ferguson et al.
(Continued)

FOREIGN PATENT DOCUMENTS

CN        101650193 B      6/2013
JP        2008076374 A     4/2008

OTHER PUBLICATIONS

"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.0.0, Mar. 2020, pp. 1-107.

(Continued)

*Primary Examiner* — Erika A Washington
(74) *Attorney, Agent, or Firm* — Barta Jones, PLLC

(57) ABSTRACT

There are provided measures for provision of vehicle's surrounding intelligence information. Such measures exemplarily include, at a network side node of a cellular system, receiving, from a first mobile entity, a request for combined spatiotemporal surroundings characteristics related to surroundings of said first mobile entity, generating said combined spatiotemporal surroundings characteristics related to said surroundings of said first mobile entity based on a position of said first mobile entity, and transmitting, towards said first mobile entity, said combined spatiotemporal surroundings characteristics related to said surroundings of said first mobile entity, wherein said combined spatiotemporal surroundings characteristics related to said surroundings of said first mobile entity include location information of at least one second mobile entity in the surroundings of said first mobile entity.

11 Claims, 10 Drawing Sheets

S51 transmitting, towards a network entity, a request for combined spatiotemporal surroundings characteristics related to surroundings of said first mobile entity

S52 receiving, from said network entity, said combined spatiotemporal surroundings characteristics related to said surroundings of said first mobile entity, wherein said combined spatiotemporal surroundings characteristics related to said surroundings of said first mobile entity include location information of at least one second mobile entity in the surroundings of said first mobile entity

(56) References Cited

U.S. PATENT DOCUMENTS

| | | | |
|---|---|---|---|
| 2017/0142555 A1 | 5/2017 | Ljung et al. | |
| 2017/0148326 A1 | 5/2017 | Kang et al. | |
| 2017/0327035 A1* | 11/2017 | Keiser | G08G 1/0133 |
| 2018/0061237 A1 | 3/2018 | Erickson et al. | |
| 2018/0232961 A1 | 8/2018 | Wang et al. | |
| 2019/0069269 A1 | 2/2019 | Edge et al. | |
| 2019/0079524 A1 | 3/2019 | Zhu et al. | |
| 2019/0098471 A1 | 3/2019 | Rech et al. | |
| 2019/0187723 A1 | 6/2019 | Tao et al. | |
| 2019/0220462 A1 | 7/2019 | Sun et al. | |
| 2020/0019173 A1 | 1/2020 | Chen et al. | |
| 2020/0249683 A1 | 8/2020 | Rosales et al. | |
| 2023/0282112 A1* | 9/2023 | James | G08G 1/056 |
| | | | 340/436 |

OTHER PUBLICATIONS

Yurtsever et al., "A Survey of Autonomous Driving: Common Practices and Emerging Technologies", arXiv, Apr. 2, 2020, 28 pages.
Cheng et al., "Backward Path Tracking Control for Mobile Robot with Three Trailers", International Conference on Neural Information Processing, Nov. 14-18, 2017, pp. 32-41.
Ranganathan et al., "Light-weight Localization for Vehicles using Road Markings", IEEE/RSJ International Conference on Intelligent Robots and Systems, Nov. 3-7, 2013, pp. 921-927.
Ort et al., "Autonomous Vehicle Navigation in Rural Environments Without Detailed Prior Maps", IEEE International Conference on Robotics and Automation (ICRA), May 21-25, 2018, pp. 2040-2047.
Rosique et al., "A Systematic Review of Perception System and Simulators for Autonomous Vehicles Research", Sensors, vol. 19, No. 03, Feb. 5, 2019, pp. 1-29.

Hecht, "Lidar for Self-Driving Cars", Optics and Photonics News, vol. 29, No. 01, Jan. 2018, pp. 26-33.
"Deliverable D5.2, The 5GCAR Demonstrations", Fifth Generation Communication Automotive Research and innovation, Version: v1.0, Jul. 31, 2019, pp. 1-119.
"New SID on NR Positioning Enhancements", 3GPP TSG RAN Meeting #86, RP-193237, Agenda: 9.1.1, Qualcomm Incorporated, Dec. 9-12, 2019, 4 pages.
"3rd Generation Partnership Project; Technical Specification Group Services and System Aspects; Service Enabler Architecture Layer for Verticals (SEAL); Functional architecture and information flows; (Release 16)", 3GPP TS 23.434 V16.4.0, Jul. 2020, pp. 1-120.
"3rd Generation Partnership Project; Technical Specification Group Radio Access Network; LTE Positioning Protocol (LPP) (Release 16)", 3GPP TS 37.355 V16.0.0, Mar. 2020, pp. 1-281.
"3rd Generation Partnership Project; Technical Specification Group Services and System Aspects; Service requirements for cyber-physical control applications in vertical domains; Stage 1 (Release 17)", 3GPP TS 22.104 V17.2.0, Dec. 2019, pp. 1-76.
"3rd Generation Partnership Project; Technical Specification Group Services and System Aspects; 5G System (5GS) Location Services (LCS); Stage 2 (Release 16)", 3GPP TS 23.273 V16.4.0, Jul. 2020, pp. 1-96.
"3rd Generation Partnership Project, Technical Specification Group Services and System Aspects; Study on enhanced application layer support for location services; (Release 19)", 3GPP TR 23.700-72 V19.0.0, Sep. 2024, pp. 1-62.
Zhang et al., "Vehicular Communication Networks in the Automated Driving Era", IEEE Communications Magazine, vol. 56, No. 09, Sep. 17, 2018, pp. 26-32.
Fujii, "Smart Spectrum Management for V2X", IEEE International Symposium on Dynamic Spectrum Access Networks (DySPAN), Oct. 22-25, 2018, 8 pages.
Invitation to Pay Additional Fees received for corresponding Patent Cooperation Treaty Application No. PCT/EP2020/079307, dated March 16, 20121, 13 pages.

* cited by examiner

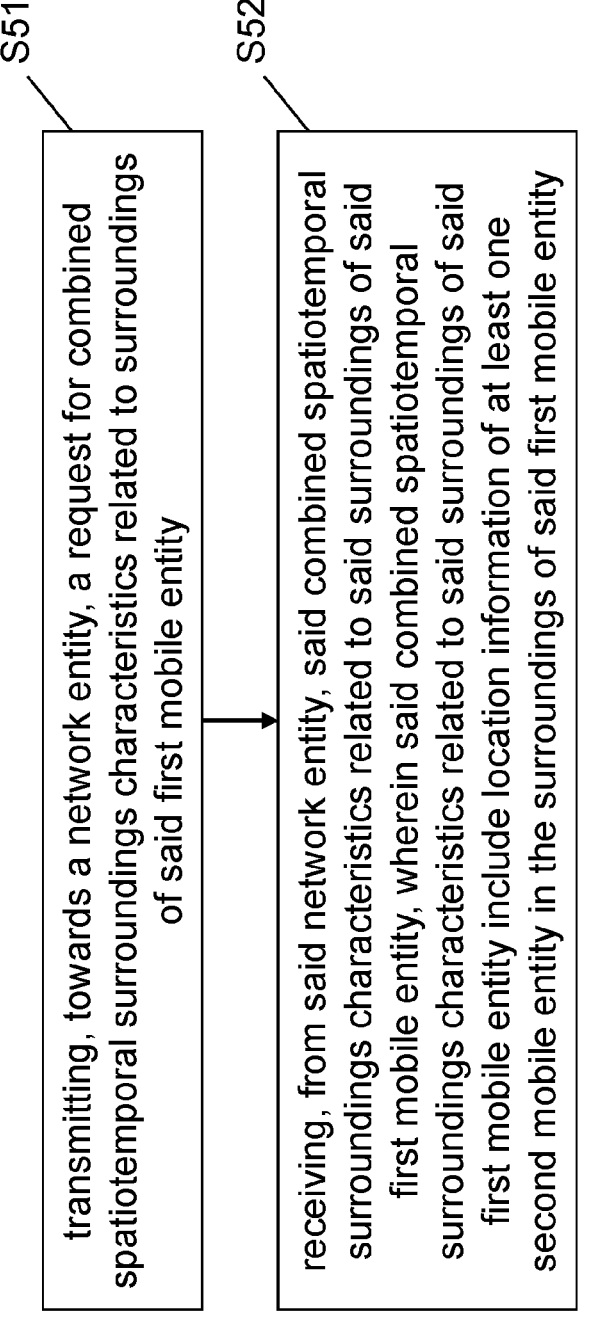

S51 transmitting, towards a network entity, a request for combined spatiotemporal surroundings characteristics related to surroundings of said first mobile entity

S52 receiving, from said network entity, said combined spatiotemporal surroundings characteristics related to said surroundings of said first mobile entity, wherein said combined spatiotemporal surroundings characteristics related to said surroundings of said first mobile entity include location information of at least one second mobile entity in the surroundings of said first mobile entity

Fig. 5

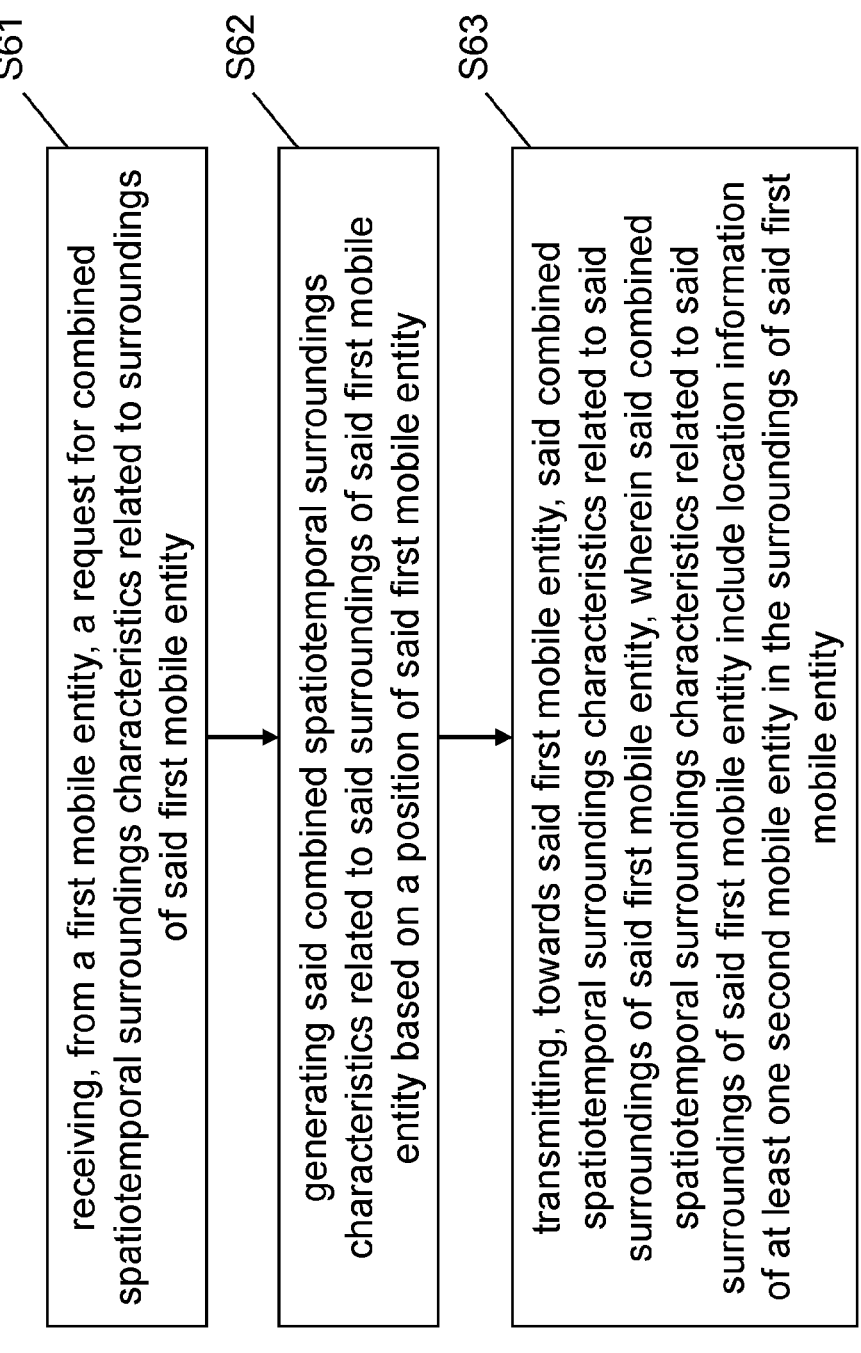

S61 receiving, from a first mobile entity, a request for combined spatiotemporal surroundings characteristics related to surroundings of said first mobile entity

S62 generating said combined spatiotemporal surroundings characteristics related to said surroundings of said first mobile entity based on a position of said first mobile entity

S63 transmitting, towards said first mobile entity, said combined spatiotemporal surroundings characteristics related to said surroundings of said first mobile entity, wherein said combined spatiotemporal surroundings characteristics related to said surroundings of said first mobile entity include location information of at least one second mobile entity in the surroundings of said first mobile entity

Fig. 6

PROVISION OF UE'S SURROUNDING INFORMATION

CROSS REFERENCE TO RELATED APPLICATION

This patent application is a U.S. National Stage application of International Patent Application Number PCT/EP2020/079307 filed Oct. 19, 2020, which is hereby incorporated by reference in its entirety.

FIELD

Various example embodiments relate to provision of vehicle's surrounding intelligence information. More specifically, various example embodiments exemplarily relate to measures (including methods, apparatuses and computer program products) for realizing provision of vehicle's surrounding intelligence information.

BACKGROUND

The present specification generally relates to automotive applications where autonomous or semi-autonomous vehicles use positioning information to assist their decisions as of which direction and speed to adopt.

Traditionally, vehicles use assisted global navigation satellite system (GNSS) approaches assisted with correction data provided by terrestrial means, i.e., via the terrestrial network. The location estimation is typically performed at the vehicle itself, i.e., it corresponds to a UE-based positioning.

The assistance data is provided to the user equipment (UE) by the location management function (LMF), and is used for performing corrections on the estimated position. In particular, the assistance data contains orbital position data of satellites, time clock information, satellite signal biases and altitude information (Rel-15), and ionospheric correction, signal phase bias corrections, range accuracy (Rel-16).

An issue addressed with the present disclosure relates to the fact that vehicles must make decisions on their own movement (e.g., direction and speed) which depend on the relative locations at current and future time of nearby vehicles, pedestrians, cyclists, other moving objects, etc.

That is, in many cases, a vehicle makes a decision that depends not only on its own position, but also on (predicted) position of nearby vehicles. The (autonomous) vehicle's decision also depends on intelligence regarding nearby vehicles' intention to modify their velocity vector (e.g., turn, decelerate, accelerate). This is the typical assumption in traditional human-based vehicle steering, where the human driver makes an estimation of the future position of nearby vehicles and assesses whether a change of his/her own vehicle steady state would be safe, make sense, or would cause problems to the traffic.

In a more concrete view, autonomous vehicles should maintain a "steady state" condition with a constant velocity vector (for example, with respect to the highway lane they are using), unless they need to break such steady state. Breaking the steady state is the part that needs caution, since this is the part which is followed by a decision on which movement the vehicle should take with respect to other vehicles in the area.

As an example, when overpassing, a vehicle needs to predict whether there is enough time to merge into the left lane before another approaching vehicle reaches that point. Human drivers make such calculations instinctively.

Such prediction, and the determination of the vehicle's surroundings and the impact of the vehicle's actions (e.g. overpassing) on other vehicles or, more general, other traffic participants, and the impact of other vehicles or, more general, other traffic participants, on the vehicle's (decisions on) actions (e.g. overpassing) need to be done based on information on the vehicle's surroundings.

Although some information can be obtained locally (at the UE/vehicle) using data from cameras/sensors techniques (e.g. by means of sensing and machine vision techniques), sensor data can be insufficient, due to performance limitations of the sensors:

cameras can be highly affected by illumination conditions, rain, snow, fog or smoke, RADARs have limited resolution, can produce false positives due to bouncing of the emitted signals, LiDARs are affected by weather conditions (e.g. rain and snow) and dusty environments, require high power and might have reduced their range detection depending on reflectivity of the objects;

challenging scenarios for sensor perception, such as:

blockage in front of the sensors, e.g. a large vehicle (e.g. truck) in front/side, blocking vision, nearby vehicles located right behind a corner building, problematic weather conditions, e.g. heavy rain, fog, snow may prevent clear vision of/on surrounding vehicles, far distant objects required to be detected.

FIG. 8 shows a schematic diagram of an example of a vehicle environment. In particular, FIG. 8 illustrates a large truck significantly blocking surrounding vehicles' visions.

In such scenarios (where the sensor data is not reliable), information regarding the nearby vehicles is essential for not causing any traffic issues/collisions. Even for the case that vehicles can sense surroundings, obtaining predictive information only using sensors/cameras can be limited.

Hence, the problem arises that relevant information enabling the UE/vehicle to make safe decisions on its own behavior as a traffic participant considering the behavior (present/future) of other traffic participants may be unavailable and/or undeterminable for the UE/vehicle.

Hence, there is a need to provide for provision of vehicle's surrounding intelligence information.

SUMMARY

Various example embodiments aim at addressing at least part of the above issues and/or problems and drawbacks.

Various aspects of example embodiments are set out in the appended claims.

According to an example aspect, there is provided a method of a first mobile entity, the method comprising transmitting, towards a network entity, a request for combined spatiotemporal surroundings characteristics related to surroundings of said first mobile entity, and receiving, from said network entity, said combined spatiotemporal surroundings characteristics related to said surroundings of said first mobile entity, wherein said combined spatiotemporal surroundings characteristics related to said surroundings of said first mobile entity include location information of at least one second mobile entity in the surroundings of said first mobile entity.

According to an example aspect, there is provided a method of a network entity, the method comprising receiving, from a first mobile entity, a request for combined spatiotemporal surroundings characteristics related to surroundings of said first mobile entity, generating said combined spatiotemporal surroundings characteristics related to said surroundings of said first mobile entity based on a position of said first mobile entity, and transmitting, towards said first mobile entity, said combined spatiotemporal surroundings characteristics related to said surroundings of said first mobile entity, wherein said combined spatiotemporal surroundings characteristics related to said surroundings of said first mobile entity include location information of at least one second mobile entity in the surroundings of said first mobile entity.

According to an example aspect, there is provided an apparatus of a first mobile entity, the apparatus comprising transmitting circuitry configured to transmit, towards a network entity, a request for combined spatiotemporal surroundings characteristics related to surroundings of said first mobile entity, and receiving circuitry configured to receive, from said network entity, said combined spatiotemporal surroundings characteristics related to said surroundings of said first mobile entity, wherein said combined spatiotemporal surroundings characteristics related to said surroundings of said first mobile entity include location information of at least one second mobile entity in the surroundings of said first mobile entity.

According to an example aspect, there is provided an apparatus of a network entity, the apparatus comprising receiving circuitry configured to receive, from a first mobile entity, a request for combined spatiotemporal surroundings characteristics related to surroundings of said first mobile entity, generating circuitry configured to generate said combined spatiotemporal surroundings characteristics related to said surroundings of said first mobile entity based on a position of said first mobile entity, and transmitting circuitry configured to transmit, towards said first mobile entity, said combined spatiotemporal surroundings characteristics related to said surroundings of said first mobile entity, wherein said combined spatiotemporal surroundings characteristics related to said surroundings of said first mobile entity include location information of at least one second mobile entity in the surroundings of said first mobile entity.

According to an example aspect, there is provided an apparatus of a first mobile entity, the apparatus comprising at least one processor, at least one memory including computer program code, and at least one interface configured for communication with at least another apparatus, the at least one processor, with the at least one memory and the computer program code, being configured to cause the apparatus to perform transmitting, towards a network entity, a request for combined spatiotemporal surroundings characteristics related to surroundings of said first mobile entity, and receiving, from said network entity, said combined spatiotemporal surroundings characteristics related to said surroundings of said first mobile entity, wherein said combined spatiotemporal surroundings characteristics related to said surroundings of said first mobile entity include location information of at least one second mobile entity in the surroundings of said first mobile entity.

According to an example aspect, there is provided an apparatus of a network entity, the apparatus comprising at least one processor, at least one memory including computer program code, and at least one interface configured for communication with at least another apparatus, the at least one processor, with the at least one memory and the computer program code, being configured to cause the apparatus to perform receiving, from a first mobile entity, a request for combined spatiotemporal surroundings characteristics related to surroundings of said first mobile entity, generating said combined spatiotemporal surroundings characteristics related to said surroundings of said first mobile entity based on a position of said first mobile entity, and transmitting, towards said first mobile entity, said combined spatiotemporal surroundings characteristics related to said surroundings of said first mobile entity, wherein said combined spatiotemporal surroundings characteristics related to said surroundings of said first mobile entity include location information of at least one second mobile entity in the surroundings of said first mobile entity.

According to an example aspect, there is provided a computer program product comprising computer-executable computer program code which, when the program is run on a computer (e.g. a computer of an apparatus according to any one of the aforementioned apparatus-related exemplary aspects of the present disclosure), is configured to cause the computer to carry out the method according to any one of the aforementioned method-related exemplary aspects of the present disclosure.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient obtaining, collecting, processing of information regarding surroundings of a terminal or a vehicle including said terminal and provision of the results of such processing to the terminal or vehicle including said terminal to thereby solve at least part of the problems and drawbacks identified in relation to the prior art.

In particular, any one of the above aspects integrates 5G positioning into vehicle-to-everything (V2X) use cases, which is in-line with industrial customer requirements where 5G positioning is an add-on to existing GNSS solutions.

Further, any one of the above aspects enables off-loading of computation power from vehicles for conducting analytics of nearby vehicles.

Still further, any one of the above aspects creates business value for 5G positioning by means of the surrounding intelligence information. That is, otherwise existing GNSS receivers can process only their own position but not others.

By way of example embodiments, there is provided provision of vehicle's surrounding intelligence information. More specifically, by way of example embodiments, there are provided measures and mechanisms for realizing provision of vehicle's surrounding intelligence information.

Thus, improvement is achieved by methods, apparatuses and computer program products enabling/realizing provision of vehicle's surrounding intelligence information.

BRIEF DESCRIPTION OF THE DRAWINGS

In the following, the present disclosure will be described in greater detail by way of non-limiting examples with reference to the accompanying drawings, in which FIG. 5 is a schematic diagram of a procedure according to example embodiments, FIG. 6 is a schematic diagram of a procedure according to example embodiments.

DETAILED DESCRIPTION

Figure 1:
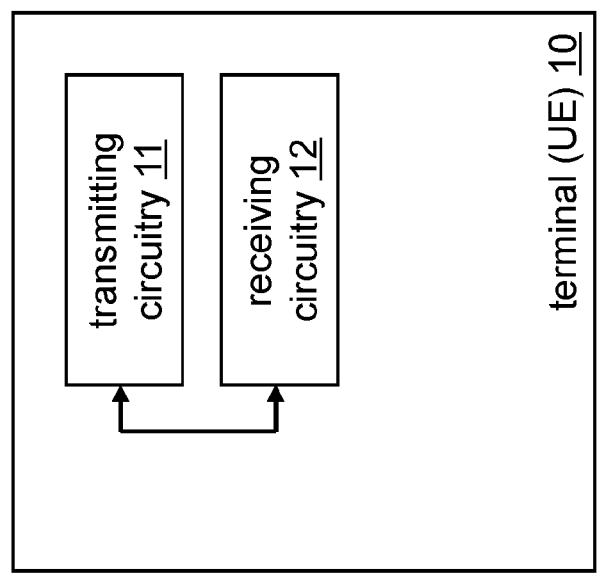
FIG. 1 is a block diagram illustrating an apparatus according to example embodiments.

The present disclosure is described herein with reference to particular non-limiting examples and to what are presently considered to be conceivable embodiments. A person skilled in the art will appreciate that the disclosure is by no means limited to these examples, and may be more broadly applied.

It is to be noted that the following description of the present disclosure and its embodiments mainly refers to specifications being used as non-limiting examples for certain exemplary network configurations and deployments. Namely, the present disclosure and its embodiments are mainly described in relation to 3GPP specifications being used as non-limiting examples for certain exemplary network configurations and deployments. In particular, V2X communication is used as a non-limiting example for the applicability of thus described example embodiments. As such, the description of example embodiments given herein specifically refers to terminology which is directly related thereto. Such terminology is only used in the context of the presented non-limiting examples, and does naturally not limit the disclosure in any way. Rather, any other communication or communication related system deployment, etc. may also be utilized as long as compliant with the features described herein.

Hereinafter, various embodiments and implementations of the present disclosure and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to example embodiments, in general terms, there are provided measures and mechanisms for (enabling/ realizing) provision of vehicle's surrounding intelligence information.

As discussed above, in scenarios where e.g. the sensor data is not reliable, information regarding the nearby vehicles is essential for not causing any traffic issues/ collisions. Even for the case that vehicles can sense surroundings, obtaining predictive information only using sensors/cameras can be limited. For example, there is no consideration of previous location of nearby vehicles taken into account.

While known vehicles modify e.g. their speed based on instantaneous sensed (utilizing sensors) locations of other vehicles, according to example embodiments, the network (e.g. LMF) typically having much more information e.g. regarding trajectory of nearby vehicles is allowed to make more accurate predictions and is thus enabled to provide such surrounding intelligence information to UEs/vehicles. Hence, according to example embodiments, a centralized approach where the network/LMF provides such surrounding intelligence information is implemented.

In other words, turning, overpassing, accelerating, decelerating etc. of a vehicle (including a UE) must be done after the vehicle has collected surrounding intelligence information. According to example embodiments, surrounding intelligence information (e.g. on predicted future locations of nearby vehicles) is calculated at the network (e.g. LMF) and provided to the vehicle (UE) upon request.

As such, with such centralized solution according to example embodiments, a corresponding gap in known prior art can be closed.

In general, according to example embodiments, a UE request for surrounding intelligence information is implemented. According to example embodiments, this is related to the so-called mobile-originated location request (MO-LR) and can be implemented as a modified version of MO-LR. MO-LR is defined in $3^{rd}$ Generation Partnership Project (3GPP) TS38.305, an extract of which is given below.

Figure 7:
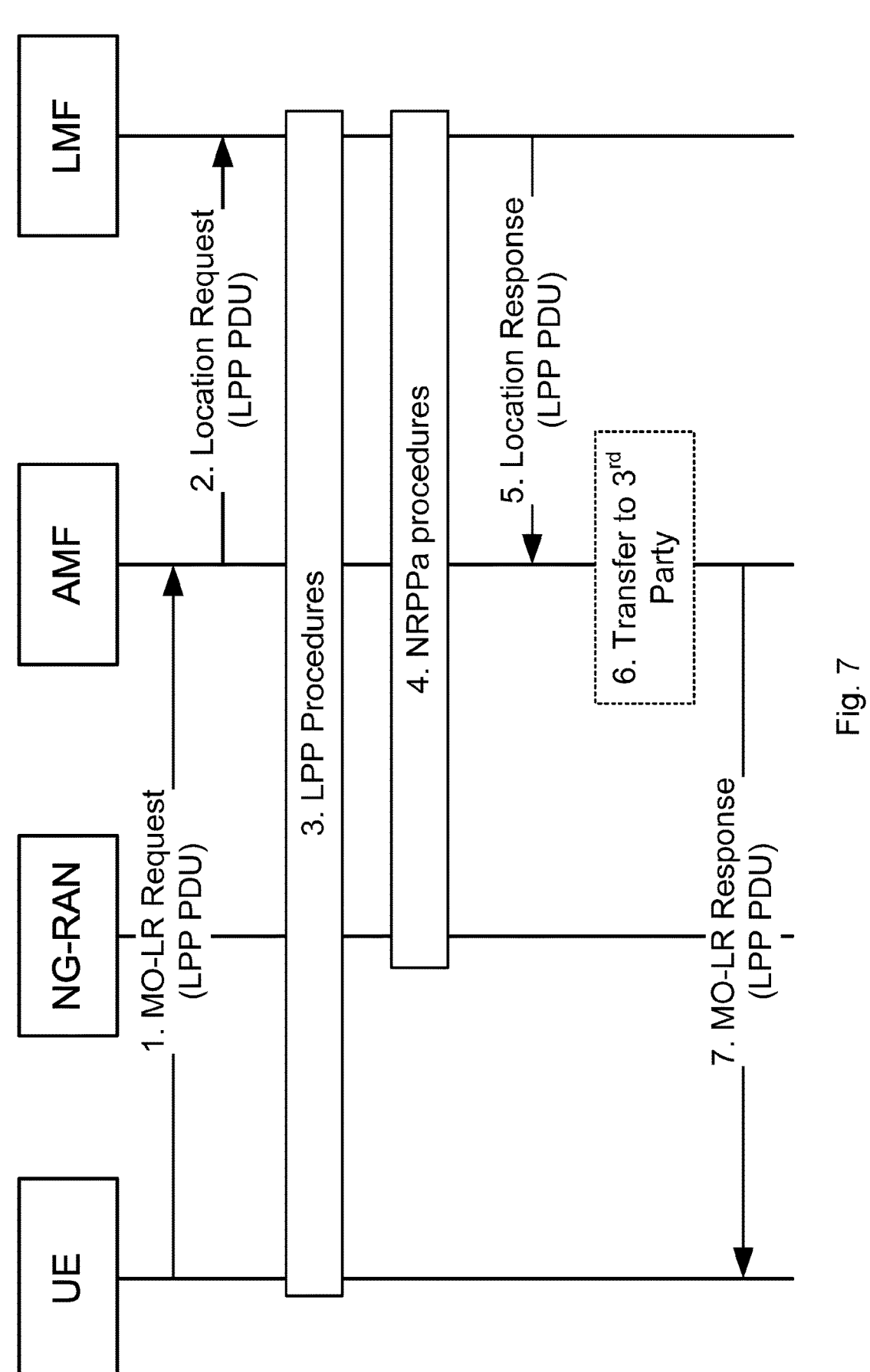
FIG. 7 shows a schematic diagram of signaling sequences.
Figure 8:
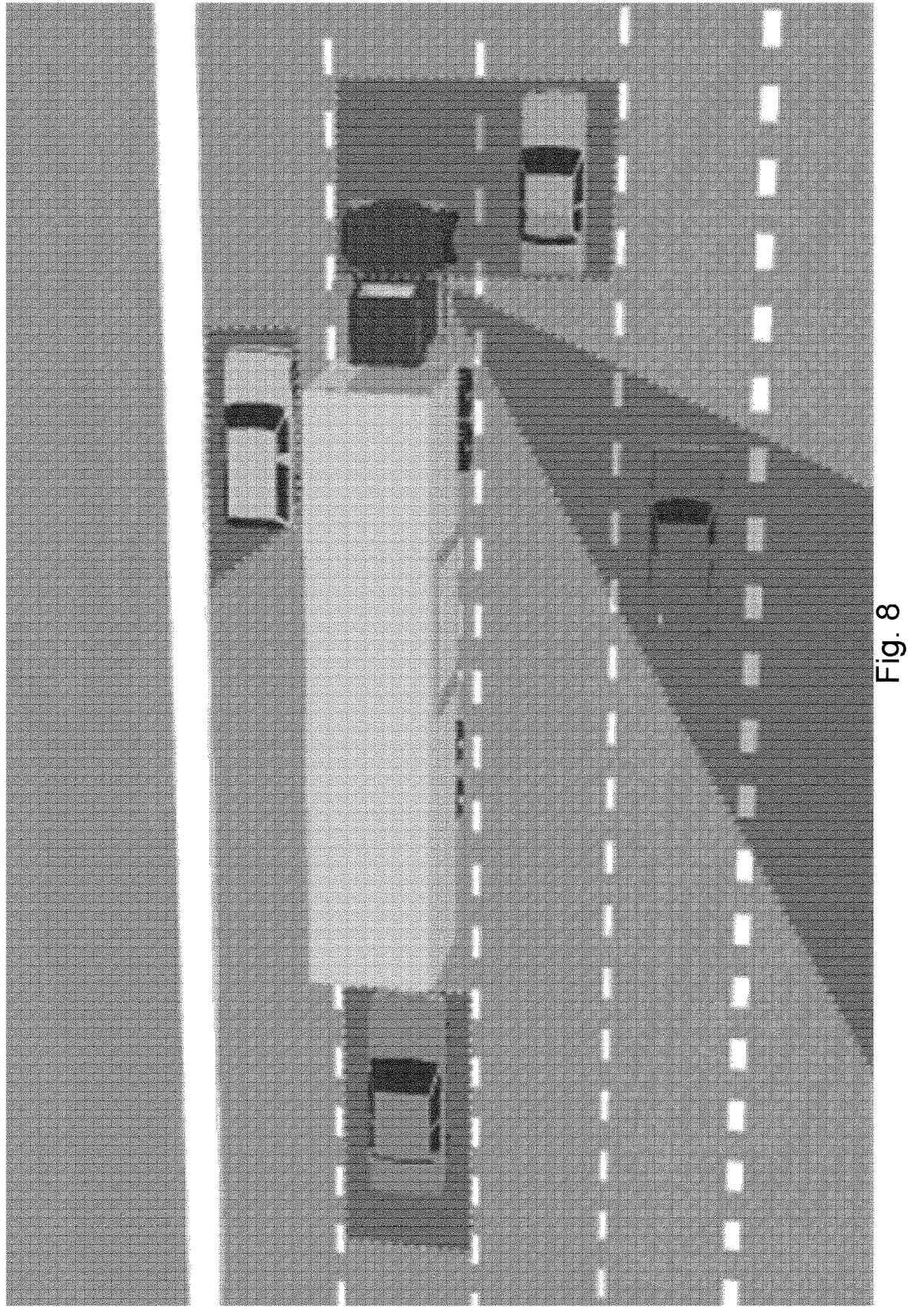
FIG. 8 shows a schematic diagram of an example of a vehicle environment.

FIG. 7 shows a schematic diagram of signaling sequences, and in particular illustrates UE positioning operations to support MO-LR. More specifically, FIG. 7 shows the sequence of operations for an MO-LR service, starting at the point where an location services (LCS) client in the UE or the user has requested some location service (e.g., retrieval of the UE's location or transfer of the UE's location to a third party).

The steps illustrated in FIG. 7 (MO-LR service support) are as explained below:

1. The UE sends a Non-Access Stratum (NAS) level MO-LR request to the access and mobility management function (AMF). The MO-LR request may carry a Long Term Evolution (LTE) positioning protocol (LPP) packet data unit (PDU) to instigate one or more LPP procedures to transfer capabilities, request assistance data, request location information and/or transfer location information (e.g. location measurements).

2. The AMF sends a location request to the LMF and includes any LPP PDU received in step 1.

3. The LMF may obtain location related information from the UE and/or from the serving Next-Generation Radio Access Network (NG-RAN) node. In the former case or if an immediate response is needed to any LPP procedure instigated by the UE in step 1 (e.g., a request for assistance data), the LMF instigates one or more LPP procedures to transfer UE positioning capabilities, provide assistance data to the UE and/or obtain location information from the UE. The UE may also instigate further LPP procedures after the first LPP message is received from the LMF (e.g., to request assistance data or to request further assistance data).

4. If the LMF needs location related information for the UE from the NG-RAN, the LMF instigates one or more New Radio Positioning Protocol A (NRPPa) procedures. Step 4 may also precede step 3 or occur in parallel with it.

5. The LMF returns a location response to the AMF with any location estimate obtained as a result of steps 3 and 4, and/or with a final LPP message (e.g., that could provide a location estimate to the UE if requested by the UE in step 1).

6. If the UE requested location transfer to a third party the AMF transfers the location received from the LMF in step 5 to the third party as defined in 3GPP TS 23.273.

7. The AMF sends a NAS level MO-LR response to the UE, carrying any final LPP PDU that was received in step 5.

However, while example embodiments are explained with reference to the MO-LR processing, these are not limited to an implementation oriented on the MO-LR processing (i.e. as a modified MO-LR processing), but several ways may be utilized as long as the information as discussed below is exchanged between vehicles/UEs and the network for assisting the vehicles'/UEs' decision finding.

FIG. 1 is a block diagram illustrating an apparatus according to example embodiments. The apparatus may be a terminal 10 such as a user equipment comprising a transmitting circuitry 11 and a receiving circuitry 12. The transmitting circuitry 11 transmits, towards a network entity, a request for combined spatiotemporal surroundings characteristics related to surroundings of said first mobile entity. The receiving circuitry 12 receives, from said network entity, said combined spatiotemporal surroundings characteristics related to said surroundings of said first mobile entity. Here, the combined spatiotemporal surroundings characteristics related to said surroundings of said first mobile entity include location information of at least one second mobile entity in the surroundings of said first mobile entity. FIG. 5 is a schematic diagram of a procedure according to example embodiments. The apparatus according to FIG. 1 may perform the method of FIG. 5 but is not limited to this method. The method of FIG. 5 may be performed by the apparatus of FIG. 1 but is not limited to being performed by this apparatus.

As shown in FIG. 5, a procedure according to example embodiments comprises an operation of transmitting (S51), towards a network entity, a request for combined spatiotemporal surroundings characteristics related to surroundings of said first mobile entity, and an operation of receiving (S52), from said network entity, said combined spatiotemporal surroundings characteristics related to said surroundings of said first mobile entity, wherein said combined spatiotemporal surroundings characteristics related to said surroundings of said first mobile entity include location information of at least one second mobile entity in the surroundings of said first mobile entity.

Figure 2:
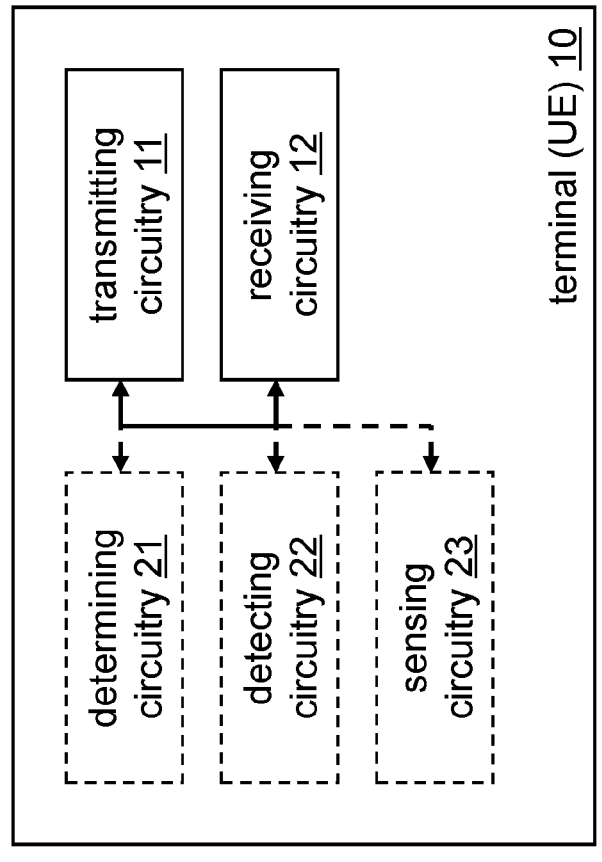
FIG. 2 is a block diagram illustrating an apparatus according to example embodiments.

FIG. 2 is a block diagram illustrating an apparatus according to example embodiments. In particular, FIG. 2 illustrates a variation of the apparatus shown in FIG. 1. The apparatus according to FIG. 2 may thus further comprise a determining circuitry 21, a detecting circuitry 22, and/or a sensing circuitry 23.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to a variation of the procedure shown in FIG. 5, exemplary additional operations are given, which are inherently independent from each other as such. According to such variation, an exemplary method according to example embodiments may comprise an operation of determining an intention for a movement change of said first mobile entity, and an operation of transmitting, towards said network entity, information on said intention, wherein said combined spatiotemporal surroundings characteristics related to said surroundings of said first mobile entity is related to a section of said surroundings of said first mobile entity relevant for said movement change of said first mobile entity.

According to further example embodiments, said information on said intention comprises at least one of a type of said movement change, a direction of said movement change, and an intensity of said movement change.

According to further example embodiments, said information on said intention comprises time interval information indicative of an intention validity time interval of said intention.

According to further example embodiments, said location information of said at least one second mobile entity comprises a predicted future location of said at least one second mobile entity.

According to further example embodiments, said combined spatiotemporal surroundings characteristics related to said surroundings of said first mobile entity comprises time information indicative of a predicted future time corresponding to said location information of said at least one second mobile entity.

According to further example embodiments, said combined spatiotemporal surroundings characteristics related to said surroundings of said first mobile entity comprises trust information indicative of an accuracy of said location information of said at least one second mobile entity.

According to a variation of the procedure shown in FIG. 5, exemplary additional operations are given, which are inherently independent from each other as such. According to such variation, an exemplary method according to example embodiments may comprise an operation of receiving, from said network entity, a location request, an operation of detecting an own location of said first mobile entity, and an operation of transmitting, towards said network entity, information on said own location of said first mobile entity.

According to further example embodiments, said location request incudes a demand for sensor measurements with respect to nearby mobile entities.

According to a variation of the procedure shown in FIG. 5, exemplary additional operations are given, which are inherently independent from each other as such. According to such variation, an exemplary method according to example embodiments may comprise an operation of sensing a state of said at least one second mobile entity, and an operation of transmitting, towards said network entity, information on said state of said at least one second mobile entity.

According to a variation of the procedure shown in FIG. 5, exemplary additional operations are given, which are inherently independent from each other as such. According to such variation, an exemplary method according to example embodiments may comprise an operation of receiving, from said network entity, warning information indicative of that no predetermined minimum amount of combined spatiotemporal surroundings characteristics related to a specific area are available.

Here, it is noted that according to example embodiments, the predetermined minimum amount is defined by the network, e.g. by the network entity which may for example be an LMF. According to further example embodiments, the predetermined minimum amount is determined autonomously by the first network entity, e.g. by the terminal/UE which may for example be included in a vehicle in question.

According to further example embodiments, said method is operable at or by a terminal, user equipment, mobile station or modem.

Figure 3:
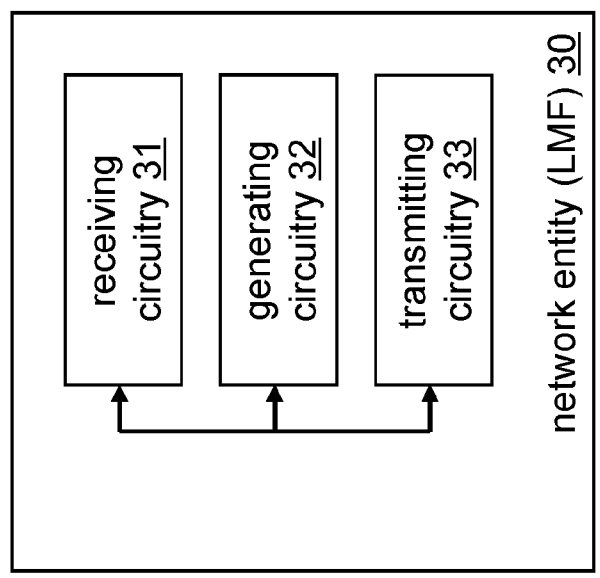
FIG. 3 is a block diagram illustrating an apparatus according to example embodiments.

FIG. 3 is a block diagram illustrating an apparatus according to example embodiments. The apparatus may be a network entity 30 such as a network side node of a cellular system such as a location management function entity comprising a receiving circuitry 31, a generating circuitry 32, and a transmitting circuitry 33. The receiving circuitry 31 receives, from a first mobile entity, a request for combined spatiotemporal surroundings characteristics related to surroundings of said first mobile entity. The generating circuitry 32 generates said combined spatiotemporal surroundings characteristics related to said surroundings of said first mobile entity based on a position of said first mobile entity. The transmitting circuitry 33 transmits, towards said first mobile entity, said combined spatiotemporal surroundings characteristics related to said surroundings of said first mobile entity. Here, the combined spatiotemporal surroundings characteristics related to said surroundings of said first mobile entity include location information of at least one second mobile entity in the surroundings of said first mobile entity. FIG. 6 is a schematic diagram of a procedure according to example embodiments. The apparatus according to FIG. 3 may perform the method of FIG. 6 but is not limited to this method. The method of FIG. 6 may be performed by the apparatus of FIG. 3 but is not limited to being performed by this apparatus.

As shown in FIG. 6, a procedure according to example embodiments comprises an operation of receiving (S61), from a first mobile entity, a request for combined spatiotemporal surroundings characteristics related to surroundings of said first mobile entity, an operation of generating (S62) said combined spatiotemporal surroundings characteristics related to said surroundings of said first mobile entity based on a position of said first mobile entity, and an operation of transmitting (S63), towards said first mobile entity, said combined spatiotemporal surroundings characteristics related to said surroundings of said first mobile entity, wherein said combined spatiotemporal surroundings characteristics related to said surroundings of said first mobile entity include location information of at least one second mobile entity in the surroundings of said first mobile entity.

Figure 4:
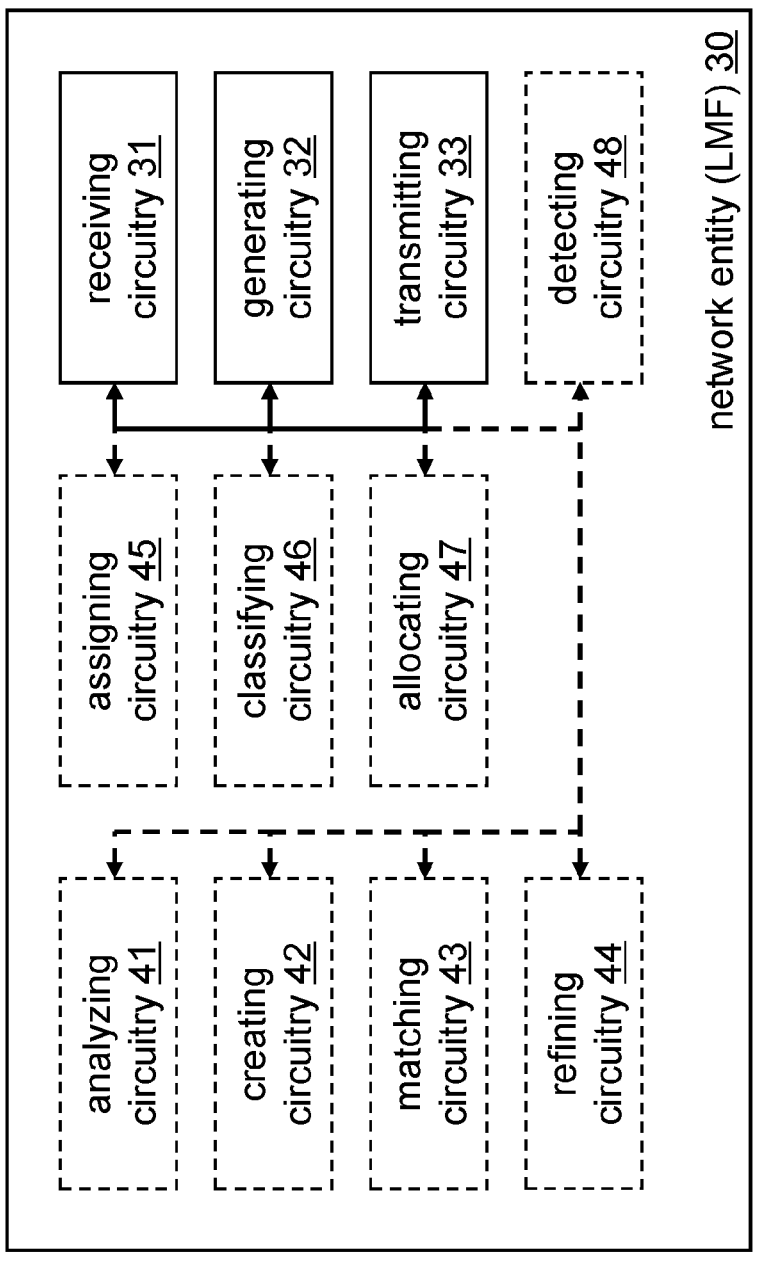
FIG. 4 is a block diagram illustrating an apparatus according to example embodiments.

FIG. 4 is a block diagram illustrating an apparatus according to example embodiments. In particular, FIG. 4 illustrates a variation of the apparatus shown in FIG. 3. The apparatus according to FIG. 4 may thus further comprise an analyzing circuitry 41, a creating circuitry 42, a matching circuitry 43, a refining circuitry 44, an assigning circuitry 45, a classifying circuitry 46, an allocating circuitry 47, and/or a detecting circuitry 48.

In an embodiment at least some of the functionalities of the apparatus shown in FIG. 3 (or 4) may be shared between two physically separate devices forming one operational entity. Therefore, the apparatus may be seen to depict the operational entity comprising one or more physically separate devices for executing at least some of the described processes.

According to a variation of the procedure shown in FIG. 6, exemplary additional operations and exemplary details of the generating operation are given, which are inherently independent from each other as such. According to such variation, an exemplary method according to example embodiments may comprise an operation of receiving, from said first mobile entity, information on an intention for a movement change of said first mobile entity. Further, such exemplary generating operation according to example embodiments may comprise an operation of analyzing said position of said first mobile entity, a position of said at least one second mobile entity, and said intention for said movement change of said first mobile entity, and an operation of creating said combined spatiotemporal surroundings characteristics related to said surroundings of said first mobile entity based on a result of said analyzing, wherein said combined spatiotemporal surroundings characteristics related to said surroundings of said first mobile entity is related to a section of said surroundings of said first mobile entity relevant for said movement change of said first mobile entity.

According to further example embodiments, said information on said intention comprises at least one of a type of said movement change, a direction of said movement change, and an intensity of said movement change.

According to further example embodiments, said information on said intention comprises time interval information indicative of an intention validity time interval of said intention.

According to further example embodiments, said location information of said at least one second mobile entity comprises a predicted future location of said at least one second mobile entity.

According to further example embodiments, said combined spatiotemporal surroundings characteristics related to said surroundings of said first mobile entity comprises time information indicative of a predicted future time corresponding to said location information of said at least one second mobile entity.

According to further example embodiments, said combined spatiotemporal surroundings characteristics related to said surroundings of said first mobile entity comprises trust information indicative of an accuracy of said location information of said at least one second mobile entity.

According to a variation of the procedure shown in FIG. 6, exemplary additional operations are given, which are inherently independent from each other as such. According to such variation, an exemplary method according to example embodiments may comprise an operation of transmitting, towards said first mobile entity, a location request, and an operation of receiving, from said first mobile entity, information on an own location of said first mobile entity.

According to further example embodiments, said location request incudes a demand for sensor measurements with respect to nearby mobile entities.

According to a variation of the procedure shown in FIG. 6, exemplary additional operations are given, which are inherently independent from each other as such. According to such variation, an exemplary method according to example embodiments may comprise an operation of receiving, from said first mobile entity, information on a state of said at least one second mobile entity, and an operation of matching said information on a state of said at least one second mobile entity with a position of said at least one second mobile entity, and an operation of refining said location information of said at least one second mobile entity based on said matching.

According to a variation of the procedure shown in FIG. 6, exemplary additional operations are given, which are inherently independent from each other as such. According to such variation, an exemplary method according to example embodiments may comprise an operation of assigning mobile entities of a plurality of mobile entities into respective capability groups based on respective mobile entity surroundings intelligence collaboration related capabilities of said mobile entities of said plurality of mobile entities.

According to further example embodiments, said mobile entity surroundings intelligence collaboration related capabilities include at least one of sensor capabilities and processing capabilities.

According to a variation of the procedure shown in FIG. 6, exemplary additional operations are given, which are inherently independent from each other as such. According to such variation, an exemplary method according to example embodiments may comprise an operation of classifying areas of a plurality of areas into a plurality of area groups respectively indicative of a different degree with which surroundings intelligence leading to a predetermined minimum amount of combined spatiotemporal surroundings characteristics is enabled.

Here, it is noted that according to example embodiments, the predetermined minimum amount is defined by the network, e.g. by the network entity which may for example be an LMF. According to further example embodiments, the predetermined minimum amount is determined autonomously by the first network entity, e.g. by the terminal/UE which may for example be included in a vehicle in question.

According to a variation of the procedure shown in FIG. 6, exemplary details of the classifying operation are given, which are inherently independent from each other as such. Such exemplary classifying operation according to example embodiments may comprise an operation of allocating said areas of said plurality of said areas to any of said plurality of area groups based on said capability groups and positions of respective mobile entities assigned to said capability groups.

According to a variation of the procedure shown in FIG. 6, exemplary additional operations are given, which are inherently independent from each other as such. According to such variation, an exemplary method according to example embodiments may comprise an operation of detecting, that said first mobile entity enters a specific area of any of said plurality of area groups indicative of that surroundings intelligence leading to said predetermined minimum amount of combined spatiotemporal surroundings characteristics related to said surroundings of said first mobile entity is not enabled, and an operation of transmitting, towards said first mobile entity, warning information indicative of that no predetermined minimum amount of combined spatiotemporal surroundings characteristics related to said specific area are available.

According to further example embodiments, said method is operable at or by a network side node of a cellular system.

In other words, according to example embodiments, vehicles request and obtain a new set of position information, referred to as surrounding intelligence information, from a centralized network entity (e.g., the LMF).

Namely, on the UE-side (terminal, vehicle including terminal/UE), a surrounding intelligence request is transmitted to the network, i.e., a central entity of the network, i.e., a network side node, i.e., the LMF.

According to example embodiments, the vehicle (terminal, vehicle including terminal/UE) provides its intention (e.g., left lane merge, accelerate, decelerate) to the LMF and stamps it with a validity time interval for such intention.

According to further example embodiments, the vehicle (terminal, vehicle including terminal/UE) requests for LMF analytics (e.g. predicted future location of nearby vehicles).

According to further example embodiments, the vehicle (terminal, vehicle including terminal/UE) may provide to the LMF other sensor-based measurements of nearby UEs (e.g., 2D snapshots of yellow indicator, red brake sign, etc.).

On the LMF side (as an example of the central entity of the network ("the network")), i.e., the network side node), analytics are performed.

In particular, according to example embodiments, the network collects the vehicles' locations.

According to further example embodiments, the LMF (as an example of the central entity of the network ("the network")), i.e., the network side node) refines the mobility pattern of an UE using both cellular (5G position estimates)

and non-cellular measurement reports (i.e., sensor-collected information). The LMF matches UE's location with sensor-collected information about other UEs.

According to further example embodiments, the LMF (as an example of the central entity of the network ("the network")), i.e., the network side node) provides a list of {timestamp, predicted_location, UE_ID} of nearby vehicles to the UE.

According to further example embodiments, the LMF (as an example of the central entity of the network ("the network")), i.e., the network side node) groups devices based on their capabilities with regards to information collection. For example, devices with extended capabilities with respect to information collection (such as sensor-equipped devices) are distinguished from devices with low or zero such capabilities.

According to further example embodiments, the LMF (as an example of the central entity of the network ("the network")), i.e., the network side node) alerts UE heading into areas where insufficient information is available or the collected information is below a given level.

The above example embodiments are explained below in more specific terms.

As mentioned above, while example embodiments are explained below in more specific terms as a modification of the MO-LR processing, these are not limited to an implementation oriented on the MO-LR processing (i.e. as a modified MO-LR processing), but several ways may be utilized as long as the information as discussed below is exchanged between vehicles/UEs and the network for assisting the vehicles'/UEs' decision finding.

Figure 9:
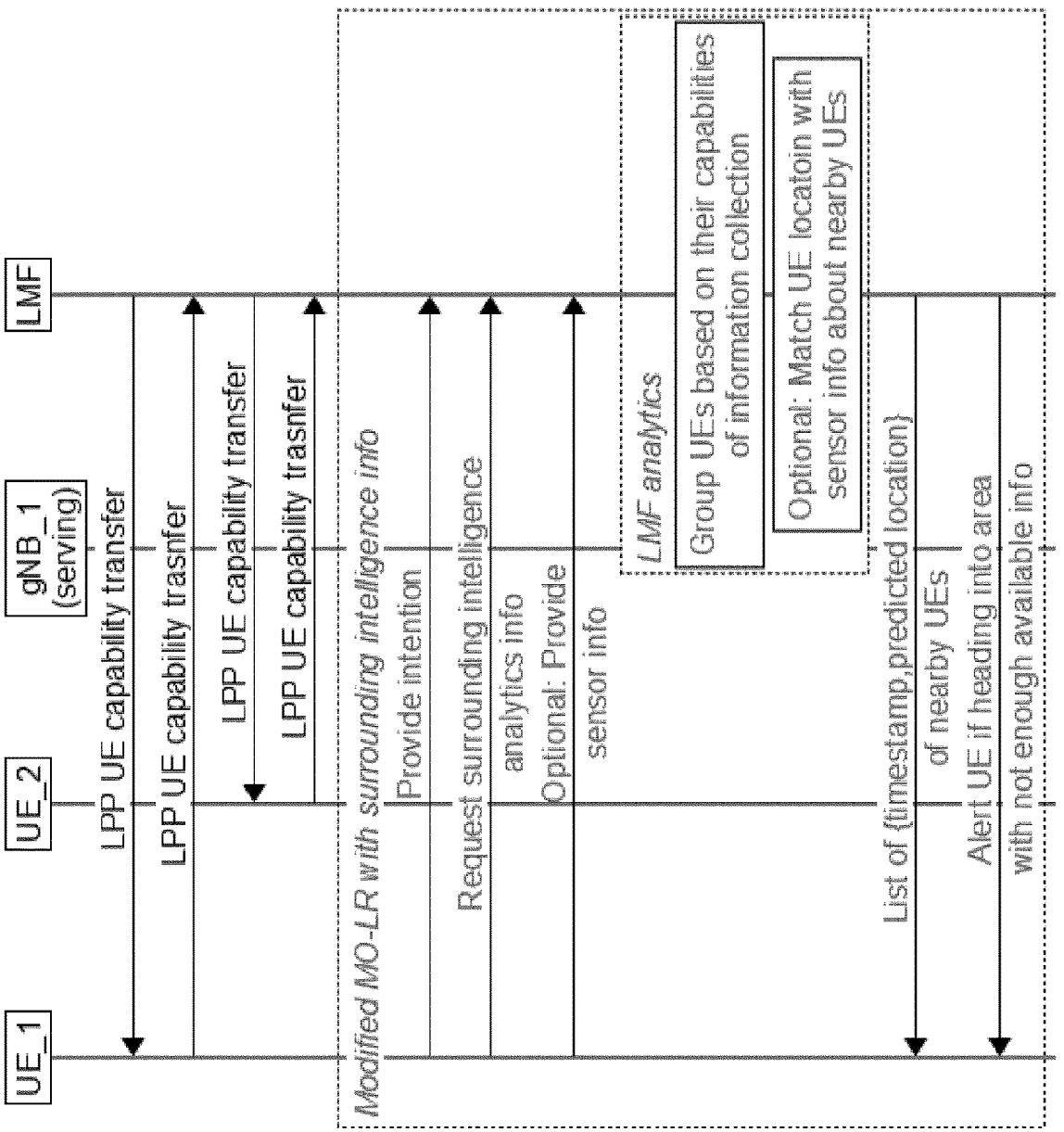
FIG. 9 shows a schematic diagram of signaling sequences according to example embodiments.

FIG. 9 shows a schematic diagram of signaling sequences according to example embodiments. In particular, FIG. 9 illustrates signaling associated with requesting and obtaining the surrounding intelligence information at the UE according to example embodiments.

According to example embodiments, the UE (terminal, vehicle including terminal/UE), potentially in addition to requesting its location information from the network, requests surrounding analytics information, which corresponds to the surrounding intelligence information that the UE needs to obtain before it breaks its velocity "steady state".

According to further example embodiments, the UE (terminal, vehicle including terminal/UE) provides its intention to the LMF, which is used by the LMF to process the surrounding intelligence information which is specific for this UE and for the particular intention of this UE. For example, if the UE/vehicle intends to overpass another vehicle by using the highway lane on its left, this intention to merge left is provided to the LMF which in turn processes it with the analytics on nearby vehicles locations (and future locations).

According to further example embodiments, the UE (terminal, vehicle including terminal/UE) stamps the message with a validity time for the intention.

According to further example embodiments, the UE (terminal, vehicle including terminal/UE) may provide to the LMF sensor information relevant to the provided intention. For instance, if the UE/vehicle intends to merge left, the sensor information involves camera information on potential turning indicators of nearby vehicles into the left lane where the UE/vehicle intends to merge into.

According to example embodiments, the LMF (as an example of the central entity of the network ("the network")), i.e., the network side node), based on the provided information, conducts analytics processing based on received/obtained information.

According to further example embodiments, such processing by the LMF (as an example of the central entity of the network ("the network")), i.e., the network side node) comprises grouping the UEs/vehicles based on their capabilities of information collection. That is, the UEs/vehicles are assigned into groups that correspond to different capabilities as regards the amount of information that can be collected (e.g., groups of UEs with/without sensing (utilizing sensors) capabilities, groups of UEs with quick/slow processing capabilities of received surrounding intelligence information). This allows the LMF to categorize the UEs based on what amount of information it can collect from such UEs, and what level of processing the UE can apply to the intelligence information provided by the LMF.

According to further example embodiments, such processing by the LMF (as an example of the central entity of the network ("the network")), i.e., the network side node) may comprise, in case the LMF has received sensor-related information from the UE/vehicle, conducting analytics that lead to matching the sensor-related information by the UE (for example, the nearby car approaching the left lane as seen by the UE camera) with the information that the LMF has collected about the nearby UEs' location and their predicted location. This allows for further refinement of the nearby UEs' predicted location, as a means of double-checking that the predicted nearby UEs' location information matches the sensor-collected one. According to example embodiments, this can be achieved with existing big data processing tools. According to further example embodiments, machine learning with data fusion may be used to determine mobility models for the UEs of interest by corroborating inputs such as 5G NR uplink/downlink (UL/DL) reference signals (RS) and reports of the involved UEs, 2D camera images reported by the UEs, road camera images and RADARS, etc.

According to further example embodiments, such processing by the LMF (as an example of the central entity of the network ("the network")), i.e., the network side node) comprises processing the current location of nearby vehicles and conducting analytics that provide the predicted future location of the UEs that is relevant to the provided UE intention in the first step. In addition, according to further example embodiments, the LMF may provide a trust metric of its own prediction, by e.g. reporting a certainty level, the variance of the prediction, etc.

According to further example embodiments, if the LMF (as an example of the central entity of the network ("the network")), i.e., the network side node) requires additional information from specific UEs, the LMF creates a location request which involves requesting location and sensor measurements from nearby UE/vehicles, which are used for the analytics processing. According to still further example embodiments, the LMF may ask other devices that do not participate to the high speed traffic to provide surrounding information, in case the area lacks the necessary level of detail.

According to further example embodiments, the LMF (as an example of the central entity of the network ("the network")), i.e., the network side node) provides to the UE requesting the surrounding intelligence information the list of nearby UEs along with their future locations associated with a corresponding timestamp and a trust metric of such location (e.g. the LMF may attach the variance of the location estimates). That is, the LMF provides to the request-ing UE all the near-future predicted locations of the other UE/vehicles within an area of interest.

According to further example embodiments, based on the obtained information, the LMF (as an example of the central entity of the network ("the network")), i.e., the network side node) determines the areas where sufficient information is collected that leads to sufficient surrounding intelligence information. That is, the LMF distinguishes between areas where it can provide such surrounding intelligence information (SII), and those where such collection and processing of information is not possible. According to example embodiments, such area classification may be generated by corroborating the different UE capability-groups (determined in a previous step as explained above) with the location of these groups. For example, classifiers like decision forests, decision trees, may be used to determine whether an area (e.g. with boundaries characterized by a set of Cartesian coordinates) is either SII-capable or not. According to still further example embodiments, such classifiers may receive as additional input the capabilities of the UEs transiting the area, capabilities of fixed infrastructure UEs in the area, etc.

According to further example embodiments, based on the request and intention of the UE of interest, in case the UE enters an area where the LMF does not have sufficient information and thus cannot support surrounding intelligence information, the LMF (as an example of the central entity of the network ("the network")), i.e., the network side node) provides a corresponding warning signal to that UE.

The above-described procedures and functions may be implemented by respective functional elements, processors, or the like, as described below.

In the foregoing exemplary description of the network entity, only the units that are relevant for understanding the principles of the disclosure have been described using functional blocks. The network entity may comprise further units that are necessary for its respective operation. However, a description of these units is omitted in this specification. The arrangement of the functional blocks of the devices is not construed to limit the disclosure, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 10:
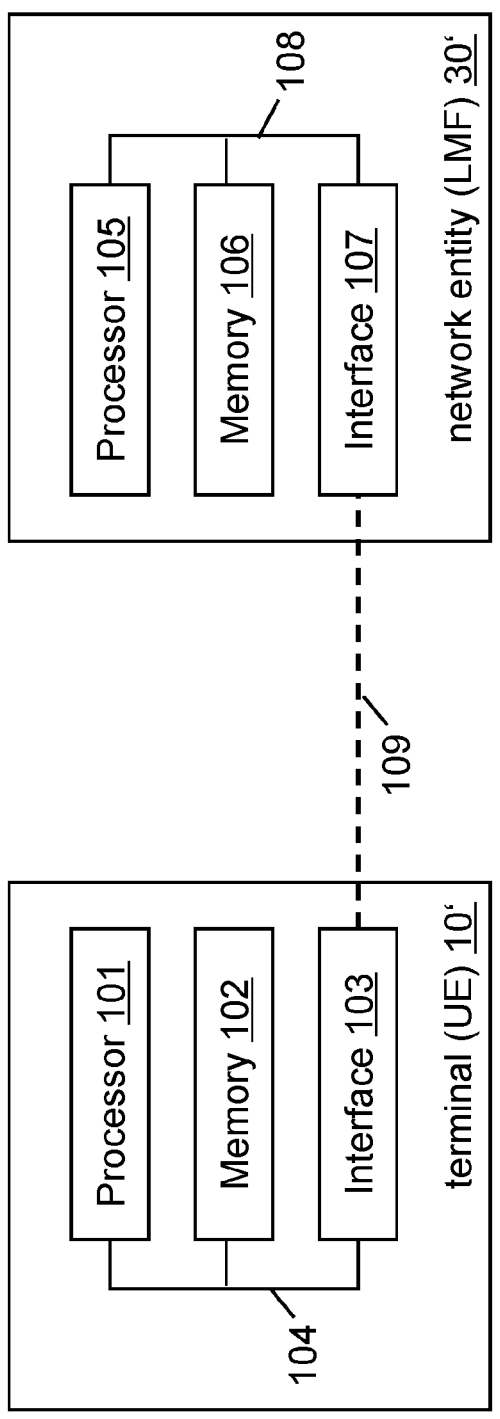
FIG. 10 is a block diagram alternatively illustrating apparatuses according to example embodiments.

In FIG. 10, an alternative illustration of apparatuses according to example embodiments is depicted. As indicated in FIG. 10, according to example embodiments, the apparatus (terminal) 10' (corresponding to the terminal 10) comprises a processor 101, a memory 102 and an interface 103, which are connected by a bus 104 or the like. Further, according to example embodiments, the apparatus (network entity) 30' (corresponding to the network entity 30) comprises a processor 105, a memory 106 and an interface 107, which are connected by a bus 108 or the like, and the apparatuses may be connected via link 109, respectively.

The processor 101/105 and/or the interface 103/107 may also include a modem or the like to facilitate communication over a (hardwire or wireless) link, respectively. The interface 103/107 may include a suitable transceiver coupled to one or more antennas or communication means for (hardwire or wireless) communications with the linked or connected device(s), respectively. The interface 103/107 is generally configured to communicate with at least one other apparatus, i.e. the interface thereof.

The memory 102/106 may store respective programs assumed to include program instructions or computer program code that, when executed by the respective processor, enables the respective electronic device or apparatus to operate in accordance with the example embodiments.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to example embodiments, an apparatus representing the terminal comprises at least one processor 101, at least one memory 102 including computer program code, and at least one interface 103 configured for communication with at least another apparatus. The processor (i.e. the at least one processor 101, with the at least one memory 102 and the computer program code) is configured to perform transmitting, towards a network entity, a request for combined spatiotemporal surroundings characteristics related to surroundings of said first mobile entity (thus the apparatus comprising corresponding means for transmitting), and to perform receiving, from said network entity, said combined spatiotemporal surroundings characteristics related to said surroundings of said first mobile entity (thus the apparatus comprising corresponding means for receiving). Here, the combined spatiotemporal surroundings characteristics related to said surroundings of said first mobile entity include location information of at least one second mobile entity in the surroundings of said first mobile entity.

According to example embodiments, an apparatus representing the network entity 30 comprises at least one processor 105, at least one memory 106 including computer program code, and at least one interface 107 configured for communication with at least another apparatus. The processor (i.e. the at least one processor 105, with the at least one memory 106 and the computer program code) is configured to perform receiving, from a first mobile entity, a request for combined spatiotemporal surroundings characteristics related to surroundings of said first mobile entity (thus the apparatus comprising corresponding means for receiving), to perform generating said combined spatiotemporal surroundings characteristics related to said surroundings of said first mobile entity based on a position of said first mobile entity (thus the apparatus comprising corresponding means for generating), and to perform transmitting, towards said first mobile entity, said combined spatiotemporal surroundings characteristics related to said surroundings of said first mobile entity (thus the apparatus comprising corresponding means for transmitting). Here, the combined spatiotemporal surroundings characteristics related to said surroundings of said first mobile entity include location information of at least one second mobile entity in the surroundings of said first mobile entity.

For further details regarding the operability/functionality of the individual apparatuses, reference is made to the above description in connection with any one of FIGS. 1 to 9, respectively.

For the purpose of the present disclosure as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present disclosure. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for provision of vehicle's surrounding intelligence information. Such measures exemplarily comprise, at a network side node of a cellular system, receiving, from a first mobile entity, a request for combined spatiotemporal surroundings characteristics related to surroundings of said first mobile entity, generating said combined spatiotemporal surroundings characteristics related to said surroundings of said first mobile entity based on a position of said first mobile entity, and transmitting, towards said first mobile entity, said combined spatiotemporal surroundings characteristics related to said surroundings of said first mobile entity, wherein said combined spatiotemporal surroundings characteristics related to said surroundings of said first mobile entity include location information of at least one second mobile entity in the surroundings of said first mobile entity.

Even though the disclosure is described above with reference to the examples according to the accompanying drawings, it is to be understood that the disclosure is not restricted thereto. Rather, it is apparent to those skilled in the art that the present disclosure can be modified in many ways without departing from the scope of the inventive idea as disclosed herein.

LIST OF ACRONYMS AND ABBREVIATIONS

3GPP 3rd Generation Partnership Project
AMF access and mobility management function
GNSS global navigation satellite system
LCS location services
LMF location management function
LPP LTE positioning protocol
LR location request
LTE Long Term Evolution
MO mobile originated
MO-LR mobile-originated location request
NAS Non-Access Stratum
NG-RAN Next-Generation Radio Access Network NRPPa New Radio Positioning Protocol A
PDU packet data unit
PRS positioning reference signals
RS reference signal
SII surrounding intelligence information
UE user equipment
UL/DL uplink/downlink
V2X vehicle-to-everything

What is claimed is:

1. A method performed by a network entity, the method comprising:

receiving, from each of a plurality of mobile entities, sensor-based measurements and location information usable for surroundings intelligence collaboration;

assigning the plurality of mobile entities into respective capability groups based on both sensor capabilities and processing capabilities of the plurality of mobile entities, wherein the assigning comprises distinguishing mobile entities having extended sensing capabilities from mobile entities having zero sensing capabilities;

classifying a plurality of geographical areas into a plurality of area groups by allocating the geographical areas to the area groups based on (i) the assigned capability groups and (ii) positions of the plurality of mobile entities, wherein each area group defines a degree to which a predetermined minimum amount of combined spatiotemporal surroundings characteristics is enabled;

receiving, from a first mobile entity, a mobile-oriented surrounding-intelligence request for combined spatiotemporal surroundings characteristics related to surroundings of the first mobile entity, the request including information on an intention for a movement change of the first mobile entity, the information on the intention comprising (i) a type of the movement change, (ii) a direction of the movement change, (iii) an intensity of the movement change, and (iv) a validity-time interval for the intention;

detecting, based on the classified area groups, that the first mobile entity is entering a specific geographical area classified into an area group defining that the predetermined minimum amount of the combined spatiotemporal surroundings characteristics is unavailable;

generating the combined spatiotemporal surroundings characteristics by analyzing (i) a position of the first mobile entity, (ii) positions of at least one second mobile entity distinct from the first mobile entity, and (iii) the received intention information, and by creating predicted future locations of the at least one second mobile entity, wherein the combined spatiotemporal surroundings characteristics comprise:

a predicted future location of the at least one second mobile entity, time information indicative of a predicted future time corresponding to the predicted future location, and a trust metric comprising a certainty level or variance defining an accuracy of the predicted future location; and transmitting, towards the first mobile entity, the combined spatiotemporal surroundings characteristics specific to the intention of the first mobile entity, and warning information indicating that the specific geographical area lacks the predetermined minimum amount of combined spatiotemporal surroundings characteristics.

2. The method of claim 1, wherein the information on the intention further comprises time interval information indicative of an intention validity time interval for the movement change of the first mobile entity.

3. The method of claim 2, wherein generating the combined spatiotemporal surroundings characteristics comprises creating surroundings characteristics related to a section of the surroundings of the first mobile entity that is relevant to the movement change indicated by the intention.

4. The method of claim 3, wherein generating the combined spatiotemporal surroundings characteristics further comprises matching sensor-collected information reported by the first mobile entity with positions of the at least one second mobile entity to refine the predicted future location.

5. The method of claim 4, wherein the trust metric comprises a variance of the predicted future location generated based on cellular measurements and sensor-derived mobility information.

6. The method of claim 5, wherein assigning the plurality of mobile entities into the capability groups comprises distinguishing mobile entities having sensing capabilities from mobile entities having zero sensing capabilities.

7. The method of claim 6, wherein classifying the plurality of geographical areas comprises allocating the geographical areas into the plurality of area groups based on both the capability groups and positions of respective mobile entities assigned to the capability groups.

8. The method of claim 7 further comprising, prior to generating the combined spatiotemporal surroundings characteristics, transmitting a location request that includes a demand for sensor measurements with respect to nearby mobile entities, in response to determining that additional information is required for analytics.

9. The method of claim 8, wherein generating the combined spatiotemporal surroundings characteristics further comprises receiving, from the first mobile entity, information on a state of the at least one second mobile entity and refining the predicted future location based on the received state information.

10. The method of claim 9, wherein transmitting the warning information occurs responsive to detecting that the first mobile entity is entering an area in which the surrounding intelligence information is below a predetermined minimum level, and wherein the warning information indicates that no predetermined minimum amount of combined spatiotemporal surroundings characteristics is available for that area.

11. An apparatus of a network entity, the apparatus comprising:

at least one processor; and at least one non-transitory memory storing instructions that, when executed with the at least one processor, cause the apparatus to:

receive, from each of a plurality of mobile entities, sensor-based measurements and location information usable for surroundings intelligence collaboration;

assign the plurality of mobile entities into respective capability groups based on both sensor capabilities and processing capabilities of the plurality of mobile entities, wherein the assigning comprises distinguishing mobile entities having extended sensing capabilities from mobile entities having zero sensing capabilities;

classify a plurality of geographical areas into a plurality of area groups by allocating the geographical areas to the area groups based on (i) the assigned capability groups and (ii) positions of the plurality of mobile entities, wherein each area group defines a degree to which a predetermined minimum amount of combined spatiotemporal surroundings characteristics is enabled;

receive, from a first mobile entity, a mobile-oriented surrounding-intelligence request for combined spatiotemporal surroundings characteristics related to surroundings of the first mobile entity, the request including information on an intention for a movement change of the first mobile entity, the information on the intention comprising (i) a type of the movement change, (ii) a direction of the movement change, (iii) an intensity of the movement change, and (iv) a validity-time interval for the intention;

detect, based on the classified area groups, that the first mobile entity is entering a specific geographical area classified into an area group defining that the predetermined minimum amount of the combined spatiotemporal surroundings characteristics is unavailable;

generate the combined spatiotemporal surroundings characteristics by analyzing (i) a position of the first mobile entity, (ii) positions of at least one second mobile entity distinct from the first mobile entity, and (iii) the received intention information, and by creating predicted future locations of the at least one second mobile entity, wherein the combined spatiotemporal surroundings characteristics comprise:

a predicted future location of the at least one second mobile entity, time information indicative of a predicted future time corresponding to the predicted future location, and a trust metric comprising a certainty level or variance defining an accuracy of the predicted future location; and transmit, towards the first mobile entity, the combined spatiotemporal surroundings characteristics specific to the intention of the first mobile entity, and warning information indicating that the specific geographical area lacks the predetermined minimum amount of combined spatiotemporal surroundings characteristics.

* * * * *